UNITED STATES PATENT OFFICE.

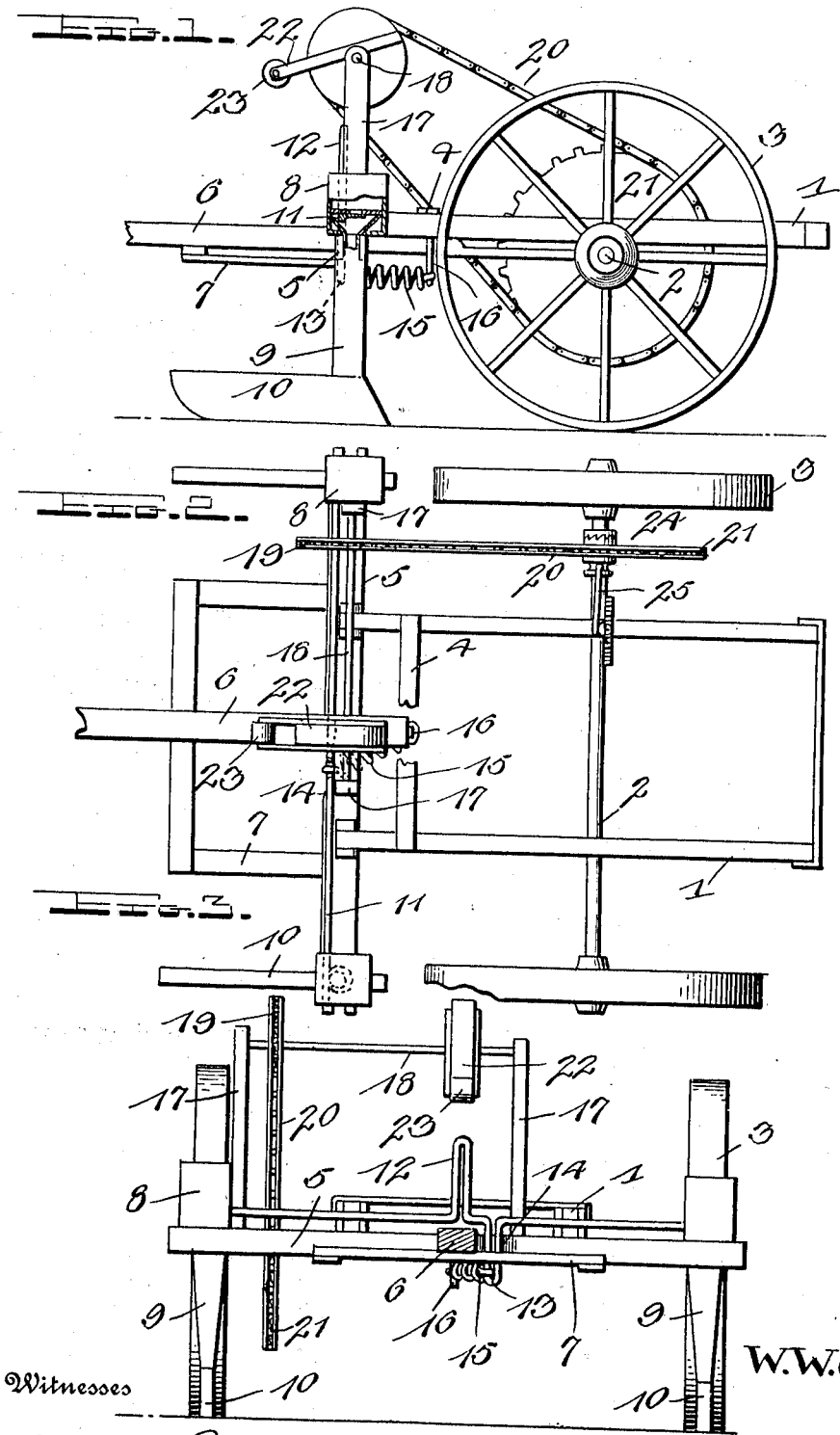

WILLIAM W. CAVENEE, OF GREENFIELD, MISSOURI.

CORN-PLANTER.

1,041,021.  Specification of Letters Patent.  Patented Oct. 15, 1912.

Application filed September 23, 1911. Serial No. 650,937.

*To all whom it may concern:*

Be it known that I, WILLIAM W. CAVENEE, a citizen of the United States, residing at Greenfield, in the county of Dade and State of Missouri, have invented certain new and useful Improvements in Corn-Planters, of which the following is a specification, reference being had to the accompanying drawings.

My invention relates to new and useful improvements in the class of seeders and planters, and more particularly to a corn planter, and my object is to provide a device of this character wherein improved means is provided for the dropping of the corn as the vehicle is propelled.

A further object of the invention resides in providing a trip lever adapted to act upon a member having coöperation with the dropping mechanisms, whereby the corn will be dropped at regular intervals as the device is propelled.

A further object of the invention resides in providing a bar having coöperation with the seed-dropping mechanisms of the hoppers, said bar being provided with a pair of arms, one of which has connection with a spring member and the other adapted for coöperation with the trip lever.

Still another object of the invention resides in providing a device which is extremely simple and durable in construction, thereby readily and cheaply manufactured, and one which is very effective and useful in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a side elevation of the device. Fig. 2 is a top plan view thereof, Fig. 3 is an end view, the tongue being shown in section.

In carrying out my invention, I shall refer to the drawing in which similar reference characters designate corresponding parts throughout the several views and in which 1 indicates a frame of any preferred size and of the usual or any preferred type, upon which is rotatably mounted an axle 2, said axle having mounted adjacent its ends, the supporting and driving wheels 3. The frame 1 is braced by the cross bars 4, and the forward end thereof is linked or pivotally engaged in any desired manner to the cross beam 5, which beam extends forward of the wheels 3 and has mounted thereon, the tongue 6. This tongue has the extreme rear end thereof extended a short distance beyond the cross beam 5, the purpose of which will be hereinafter and more particularly described, and the same is further supported or braced to said cross beam by means of the bracing frame 7 which is also supported on the cross beam 5, and thus, the frame 1 may be readily drawn forwardly, when desired.

Mounted on the cross beam 5 adjacent the ends thereof, are the seed boxes or hoppers 8, from the bottoms of which extend the boots 9, said boots being passed through the bifurcated ends of said cross beam and depending to a point a short distance therebelow where they are mounted on the runners, furrow openers or the like 10. Extending longitudinally of the cross beam 5, is a bar or rod 11, the ends of which are entered in the seed boxes or hoppers 8 to actuate the seed-dropping mechanisms or valves therewithin. This bar or rod 11 is looped or bent intermediate of its ends to form the upwardly and downwardly projecting arms 12 and 13, respectively, and when these arms are in a substantially vertical position, the dropping mechanisms or valves within the seed boxes or hoppers 8 are adapted to be closed, this being the arrangement of the bar 11 with respect to said dropping mechanisms. The front face of the cross beam 5 is provided with a vertical notch or groove 14 to receive therein the downwardly projecting arm 13 of the bar 11, and in order to retain said arms 12 and 13 normally in their vertical positions, a coil spring 15 is provided, one end of which is engaged with the lower end of said arm 13 and the opposite end of which is engaged with a lug or the like 16 depending from the rear end of the tongue 6. Thus, it will be seen that the dropping mechanisms of the seed boxes 8 will be retained normally closed and some means must be provided for the dropping of the arm 12 so as to actuate the seed-dropping mechanisms within the seed boxes to feed the corn or other grain therefrom as the device is propelled.

To this end, I provide on the cross beam 5, a pair of vertical supporting arms 17, between which is rotatably mounted a shaft 18, and mounted on said shaft, is a small sprocket wheel 19 over which extends a sprocket chain 20. Mounted on the axle 2 adjacent one of the wheels 3, is an additional and larger sprocket wheel 21 substantially in alinement with the sprocket wheel 19 and over which is also extended said chain 20 so that when the sprocket 21 is rotated, the sprocket 19 will also be rotated and correspondingly rotate the shaft 18. Mounted on the shaft 18 is a trip lever or arm 22, the outer end of which is provided with a roller 23, and as said shaft 18 is rotated, the arm 22 will be rotated therewith, so that the roller 23 will contact with the upwardly extending arm 12 on the rod 11 and force said arm 13 rearwardly. This will cause the rod 11 to turn on its bearings and actuate the seed-dropping mechanisms, and as soon as the roller 23 is released from its engagement with the arm 12, said rod 11 will be returned to its normal position by means of the spring which is in engagement with the arm 13. Thus, it will be seen that as the machine is propelled, the shaft 18 will be rotated to correspondingly cause the dropping mechanisms to be actuated at regular intervals, but in order to provide means whereby the machine may be propelled without actuating the dropping mechanisms, I provide a clutch mechanism 24 on the axle 2 and in connection with the sprocket 20. This clutch mechanism is actuated by means of a lever 25, and when it is desired to allow the machine to be drawn forwardly without dropping the seed from the hoppers, said clutch is thrown out of engagement with the sprocket 20, and vice versa, when it is desired to actuate said dropping mechanisms.

What I claim is:—

1. A planter, comprising a wheeled framework, a transversely extending beam connected thereto, seed boxes carried by said beam, a transversely-extending rod mounted on said beam and adapted to actuate the seed dropping mechanism of said boxes, said bar being provided intermediate of its ends with an upwardly projecting arm and with a downwardly projecting arm, vertically extending supporting arms mounted on said beam, a transverse shaft journaled in said arms, means operatively connecting said shaft with the axle of the wheeled framework, whereby the propulsion of the planter will rotate said shaft, a trip lever carried by said shaft and movable in the path of the upwardly projecting arm of the bar, and a spring connected to the downwardly projecting arm of the bar, for the purpose specified.

2. A planter, comprising a frame, a wheel supported axle supporting said frame, seed boxes, means for supporting said boxes, a transversely extending bar extending from one seed box to the other and operatively connected to the seed dropping mechanism of said boxes, the bar being formed intermediate of its ends with an upwardly projecting arm and a downwardly projecting arm, a spring connected to the downwardly projecting arm, whereby to hold the bar in one position, vertically extending arms, a transverse shaft journaled in said arms, a trip lever secured to said shaft and engageable with the upwardly projecting arm of the bar, for the purpose specified, a sprocket wheel secured to said shaft, a spring wheel secured to the axle, and a driving connection between said sprocket wheels.

In testimony whereof I hereunto affix my signature in the presence of two witnesses.

WILLIAM W. CAVENEE.

Witnesses:
D. A. SCOTT,
JOHN M. SCOTT.

Copies of this patent may be obtained for five cents each, by addressing the "Commissioner of Patents, Washington, D. C."